United States Patent [19]
Hiben et al.

[11] Patent Number: 5,719,903
[45] Date of Patent: Feb. 17, 1998

[54] METHOD AND APPARATUS FOR RECEIVING SYMBOLS

[75] Inventors: Bradley M. Hiben, Glen Ellyn; Donald G. Newberg, Schaumburg; Robert D. LoGalbo, Bartlett, all of Ill.

[73] Assignee: Motorola, Inc., Schaumburg, Ill.

[21] Appl. No.: 495,954

[22] Filed: Jun. 28, 1995

[51] Int. Cl.$^6$ ................ H03D 3/00; H03K 9/06
[52] U.S. Cl. ............ 375/322; 375/329; 375/332; 455/205; 329/304
[58] Field of Search ..................... 375/271, 273, 375/275, 279, 280, 281, 322, 329, 331, 332, 335; 329/300, 304; 455/205

[56] References Cited

U.S. PATENT DOCUMENTS

| | | | |
|---|---|---|---|
| 5,208,836 | 5/1993 | Edbauer | 375/331 |
| 5,307,380 | 4/1994 | Kume | 375/329 |
| 5,377,229 | 12/1994 | Wilson et al. | |
| 5,412,694 | 5/1995 | Sato et al. | 375/329 |
| 5,450,451 | 9/1995 | Isozaki | 375/273 |

Primary Examiner—Don N. Vo
Attorney, Agent, or Firm—Christopher P. Moreno

[57] ABSTRACT

Delayed symbols (204), including a current symbol (205), are compared by a comparator (206) with at least one predetermined pattern when the current symbol is equivalent to one of a set of predetermined values. Alternatively, a sign of the current symbol is compared with signs of a previous and a subsequent symbol when the current symbol is equivalent to one of the set of predetermined values. When the current symbol is equivalent to one of the set of predetermined values and when either the delayed symbols are equivalent to one of the at least one predetermined pattern or the sign of the current symbol matches the signs of the previous and subsequent symbols, a symbol corrector (208) applies a predetermined function to the current symbol to produce a received symbol (210).

19 Claims, 3 Drawing Sheets

—PRIOR ART—

METHOD AND APPARATUS FOR RECEIVING SYMBOLS

FIELD OF THE INVENTION

The present invention relates generally to wireless communications and, in particular, to a method and apparatus for receiving symbols.

BACKGROUND OF THE INVENTION

The use of symbols in wireless communication systems is generally known. Typically, a symbol is a representation of one or more binary bits and is used to modulate a parameter of a wireless communication resource, such as a radio frequency (RF) carrier. Thus, digitally represented information is used to create a stream of symbols which are then transmitted to a receiver. Upon recovery of the symbols at the receiver, the digital information can be reconstructed. This allows more efficient use of available communication resources in wireless communication systems.

For example, in systems conforming to requirements recently promulgated by the Association of Public Safety Communication Officers (APCO) such symbols cause, and are therefore represented by, phase shifts in a carrier signal. More precisely stated, the APCO 25 Common Air Interface (CAI) specifies quadrature phase shift keying-compatible (QPSK-c) as the required modulation type. QPSK-c is an example of well-known angle modulation and is described in U.S. Pat. No. 5,377,229 granted Dec. 27, 1994 to Wilson et al. and entitled MULTI-MODULATION SCHEME COMPATIBLE RADIO, the teachings of which are incorporated herein by reference.

To accommodate ongoing development in wireless communication technology, the QPSK-c modulation technique accommodates the use of so-called linear and constant envelope variants; compatible quadrature phase shift keying (CQPSK) and compatible 4-ary frequency modulation (C4FM), respectively. A significant difference between the two variants is that constant envelope modulation results in a broader transmission spectrum relative to linear modulation. However, both the linear and constant envelope variants rely on phase shifts in the carrier signal to convey symbols. Receivers in compliance with the APCO 25 CAI standard must be able to receive signals using either linear or constant envelope modulation without prior knowledge of the modulation type being used.

Performance of linear and constant envelope variants of QPSK-c can be illustrated using the exemplary phasor transition diagram shown in FIG. 1. A constellation of eight points, labeled A through H, is shown. As will be described in further detail hereinafter, di-bit combinations are represented as symbols, labeled ±1 and ±3, used to cause ±π/4 and ±3π/4 phase transitions in the carrier frequency. Ideally, both linear and constant envelope modulation techniques should cause identical phase transitions for a given stream of symbols. However, simulations have shown that the occurrence of certain combinations of symbols cause phase transitions other than ±π/4 and ±3π/4. In particular, it has been observed that linear modulation will sometimes cause a "longer" phase transition to occur. This is best illustrated with an example.

In this example, it is assumed that a transmitter is currently operating at constellation point H shown in FIG. 1. (For the purposes of this example, phase transitions for a constant envelope modulation scheme are shown with the solid lines, whereas phase transitions for a linear modulation scheme are shown with the dotted lines.) The occurrence of a given sequential combination of symbols (in the example shown, −1, +3, −1) results in a −π/4 transition 102 to constellation point A, followed by a +3π/4 transition 104 to constellation point E and another −π/4 transition 106 to constellation point G for the constant envelope scheme. However, the identical sequential combination of symbols results in a −π/4 transition 101 to constellation point A, followed by a −5π/4 transition 103 to constellation point F and another −π/4 transition 105 to constellation point G for the linear scheme. Although the second phase transition 103 for the linear scheme ended up at the same constellation point as the constant envelope scheme, it wrapped around in the "longer" direction. This is a well known problem in linear differential QPSK systems of which CQPSK is a subset.

At the receiver, the −5π/4 transition 103 caused by linear modulation would cause the receiver to recover a −5 symbol. As the receiver has no prior knowledge of the modulation scheme used, the −5 symbol would be attributed to noise on the transmission channel and corrected to a −3 symbol, rather than a +3 symbol. Alternatively, if a −3 symbol actually was transmitted using a constant envelope scheme, and noise on the transmission channel caused overshoot resulting in the −5 symbol, correction to a +3 symbol would be equally inaccurate. From this example it can be seen that ambiguity as to which modulation scheme is used to transmit symbols can cause performance degradation in either or both modulation schemes.

Unaccounted for, the problem described above will result in bit errors in the recovered digital information, thereby reducing overall system transmission quality. Other combinations of symbol patterns result in similarly "long" phase transitions which cause the transmitted symbols to be improperly recovered at a receiver, thereby exacerbating the problem.

A solution, or perhaps more accurately called a compromise, is to always correct symbols assuming one modulation technique and allow performance degradation for the other modulation technique, i.e., assume constant envelope modulation and suffer performance degradation in those instances in which linear modulation is used. Obviously, this will not be a satisfactory approach as the use of linear modulation becomes more prevalent in the future. Therefore, it would be advantageous to provide an approach that allows a receiver to receive signals having either linear or constant envelope modulation without prior knowledge of which modulation scheme is being used, and which substantially corrects symbol errors resulting from linear modulation without a performance degradation in constant envelope modulation.

DESCRIPTION OF A PREFERRED EMBODIMENT

The present invention provides a method and apparatus for providing received symbols. A plurality of raw symbols is provided. The raw symbols are sent through a delay line to produce delayed symbols which include a current symbol. At a comparator, it is determined if the current symbol is equivalent to one of a set of predetermined values, and if so, another comparison is performed. In a first embodiment, the delayed symbols are compared to at least one predetermined pattern. In a second embodiment, the signs of a previous symbol (delayed more than the current symbol) and a subsequent symbol (delayed less than the current symbol) are compared with a sign of the current symbol. In both the first and second embodiments, when a match occurs (i.e., the delayed symbols match one of the at least one predetermined pattern or the signs of the previous, current, and subsequent symbols match), the comparator sends a signal to a symbol corrector. Upon receiving the signal, the symbol corrector applies a predetermined function to the current symbol to produce a received symbol. In this manner, signals having either linear or constant envelope modulation can be received without significantly degrading reliability of the received symbols because correction is not mistakenly applied to symbol sequences that could not have resulted in a "long" phase shift.

Figure 2:
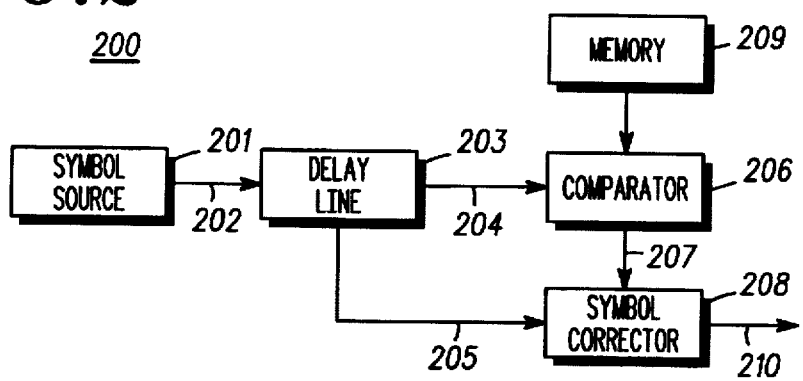
FIG. 2 is a block diagram of an apparatus for receiving symbols.

The present invention can be more fully described with reference to FIGS. 2–6. FIG. 2 is a block diagram of an apparatus 200 for receiving symbols comprising a symbol source 201, a delay line 203, a comparator 206, a symbol corrector 208, and a memory 209 operably coupled as shown.

In a modulation scheme such as QPSK-c (both its linear and constant envelope variants), the carrier phase transitions are odd multiples of π/4 radians, i.e., ±π/4 and ±3π/4. These transitions are assigned the values ±1 and ±3, respectively. Other values assigned to the phase transitions could also be used; ±1 and ±3 are chosen for convenience. In a typical RF communication system the pair of binary data bits '00' are encoded as a −3π/4 phase shift; the pair of binary data bits '01' are encoded as a −π/4 phase shift; the pair of binary data bits '11' are encoded as a +π/4 phase shift; the pair of binary data bits '10' are encoded as a +3π/4 phase shift. A suitable symbol source 201 is an RF receiver/detector that determines a symbol value based on phase angle transitions of an RF carrier. To determine the phase transition made, and hence the binary data bits sent by the transmitter, a suitable RF receiver/detector typically employs an frequency modulation (FM) discriminator followed by an integrate-and-dump filter with an integration time of one symbol, as known in the art.

The symbol source 201 provides a plurality of raw symbols 202 whose values indicate the detected phase transitions. In practice, the raw symbols 202 can assume values not only of ±1 and ±3, but also ±5 and ±7 corresponding to ±5π/4 and ±7π/4 detected phase shifts. The additional values are attributable to performance of a linear transmitter or to overshoot caused by transmission channel noise, as described above. Once again, other values could be assigned to the additional phase transitions; ±5 and ±7 are chosen for convenience.

The delay line 203 accepts the raw symbols 202 to produce delayed symbols 204. The implementation and operation of delay lines is well known in the art. One of the delayed symbols 204 is designated a current symbol 205. Furthermore, the delayed symbols 204 include one or more symbols delayed more than the current symbol (previous symbols) and one or more symbols delayed less than the current symbol (subsequent symbols). The delayed symbols 204, including the current symbol 205, are input to the comparator 206. The comparator 206 compares the current symbol with a set of predetermined values stored in the memory 209. The memory 209 may comprise any device suitable for the storage of digitally represented information. In a first embodiment, the comparator 206 also compares the delayed symbols 204 with at least one predetermined pattern stored in the memory 209. In a second embodiment, the comparator 206 also compares the sign (i.e., + or −) of the current symbol with the signs of a previous symbol and a subsequent symbol. Operation of the comparator is described in further detail below.

When the comparator 206 determines that the current symbol is equivalent to one of the set of predetermined values and either that the delayed symbols 204 are equivalent to one of the predetermined patterns or that the sign of the current symbol matches the signs of the previous and subsequent symbols, it asserts a signal 207. Upon detecting assertion of the signal 207, the symbol corrector 208 applies a predetermined function to the current symbol 205 (as received from the delay line 203) to produce a received symbol 210. As new raw symbols are provided one at a time, the delay line 203 is updated and the above process repeated.

In the preferred embodiment, the set of predetermined values comprises the values ±5 and ±7, corresponding to ±5π/4 and ±7π/4 phase shifts. Table 1 shows a list of possible predetermined patterns corresponding to a current value of ±5.

TABLE 1

| Predetermined Patterns | | | | |
|---|---|---|---|---|
| −3 | −3 | −5 | −1 | +3 |
| −3 | −1 | −5 | −1 | −3 |
| −3 | −1 | −5 | −1 | +3 |
| −3 | +1 | +5 | +1 | −3 |
| −3 | +1 | +5 | +1 | −1 |

As shown in Table 1, values in the two left columns correspond to symbols subsequent to the current symbol and values in the two right columns correspond to symbols received prior to the current symbol. A similar list of predetermined patterns corresponding to a current value of ±7 is also possible. The predetermined patterns are empirically derived by analyzing those sequential combinations of symbols which cause a linear modulator to produce a "long" phase transition. Table 1 clearly illustrates a simple rule to detect improper phase transitions resulting from linear modulation: the sign of the current symbol always matches the signs of the immediately previous and subsequent symbols. As discussed above, when the delayed symbols match one of the predetermined patterns (like those in Table 1), or when signs of the current, previous, and subsequent symbols match, it is assumed that a linear transmitter has caused the excessive phase transition.

In the preferred embodiment, the predetermined function used to correct the current symbol comprises a mapping as shown in Table 2:

TABLE 2

| Current Symbol | Maps To Received Symbol |
|---|---|
| −7 | +1 |
| −5 | +3 |
| +5 | −3 |
| +7 | −1 |

This mapping is derived from the equation:

$$RS = \text{Symbol}[(CSPT + 2\pi) \bmod 2\pi]; CSPT = -5\pi/4 \text{ or } -7\pi/4$$
$$= \text{Symbol}[(CSPT - 2\pi) \bmod 2\pi]; CSPT = +5\pi/4 \text{ or } +7\pi/4$$

where:

CSPT=phase transition corresponding to the current symbol;

RS=received symbol.

Figure 1:
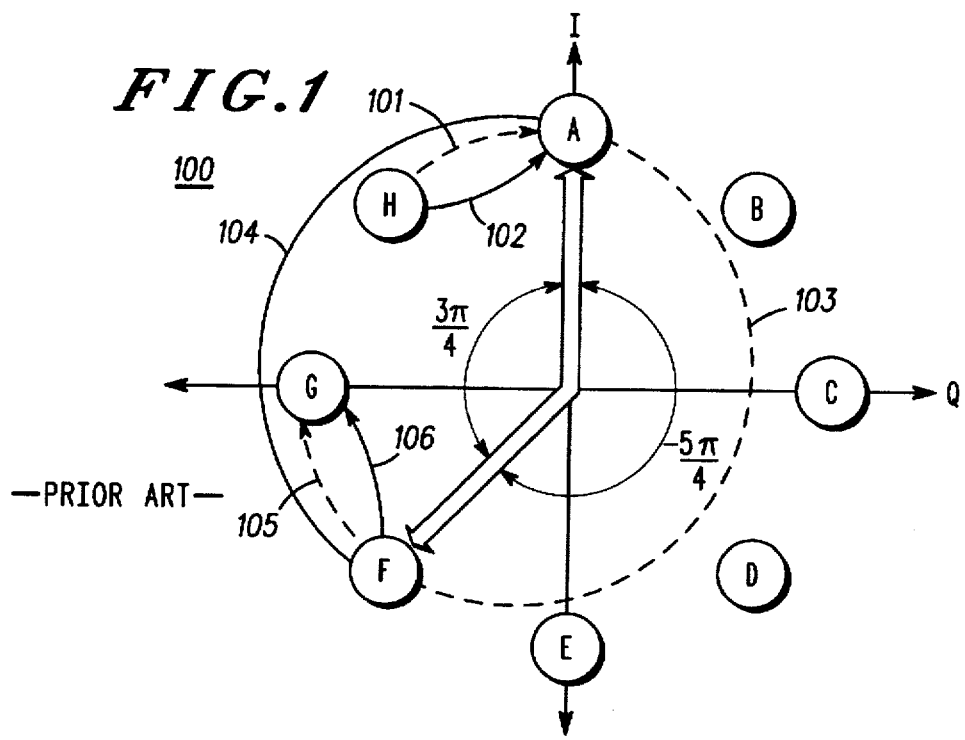
FIG. 1 is an exemplary phasor transition diagram.

The function "$(X \pm 2\pi) \bmod 2\pi$" describes adding or subtracting $2\pi$, modulo $2\pi$, to the phase transition X expressed in radians, and the function "Symbol[Y]" produces the symbol value corresponding to the phase transition Y expressed in radians. In essence, the predetermined function is converting "long" phase transitions by wrapping them around the unit circle (as shown in FIG. 1) such that the correct phase transition is derived. Thus, a −7 symbol (corresponding to a detected −7π/4 phase transition) is corrected to a +1 symbol; a −5 symbol (corresponding to a detected −5π/4 phase transition) is corrected to a +3 symbol; a +5 symbol (corresponding to a detected +5π/4 phase transition) is corrected to a −3 symbol; and a +7 symbol (corresponding to a detected +7π/4 phase transition) is corrected to a −1 symbol. It is noted that no corrections are made for any other value of the current symbol 205, nor are corrections made if the signal 207 is not asserted.

Tests performed on systems using both linear and constant envelope modulation under various static and faded noise conditions have shown that the above-described approach significantly improves linear performance while causing only very slight degradation in constant envelope performance.

Figure 3:
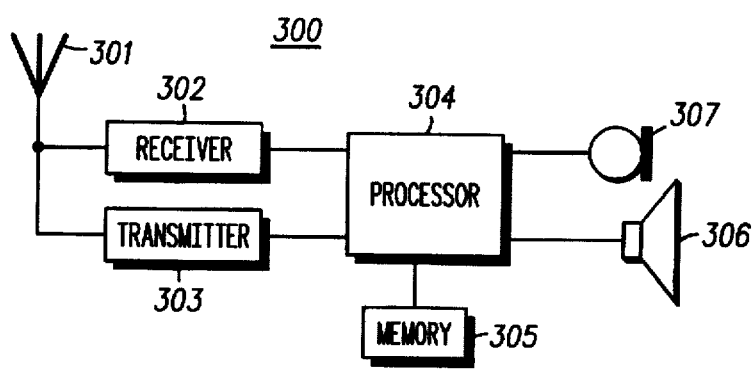
FIG. 3 is a block diagram of a communication device which may be adapted to receive symbols.

FIG. 3 is a block diagram of a wireless communication device 300 which may be adapted to receive symbols. The wireless communication device 300 comprises an antenna 301, an RF receiver 302, an RF transmitter 303, a processor 304, a memory 305, a speaker 306, and a microphone 307.

The RF receiver 302 performs linear or constant envelope demodulation of an angle modulated signal, e.g., a signal modulated using a QPSK-c compliant transmitter. The transmitter 303 performs linear or constant envelope modulation, i.e., translates symbols into phase transitions of an RF carrier. The processor 304, which may be a digital microprocessor, and the memory 305 are used to implement control and processing functions, stored as software routines in the memory 305, for the wireless communication device 300. The speaker 306 and microphone 307 serve as audio input/output devices (any necessary analog-to-digital and digital-to-analog converters are not shown, but are well known in the art). Additionally, an input/output device capable of communicating with a data terminal, fax machine, computer or similar device that produces and/or interprets digital signals can also be incorporated into the wireless communication device 300.

In the preferred embodiment, the processor 304 is used to implement the approach described above. This is more clearly shown in FIG. 4, where a detector 401, a delay line 402, a comparator 403, and a symbol corrector 404 are shown as being implemented by the processor 304. Such an implementation can be achieved using software routines stored in the memory 305 and executed by the processor 304.

In the implementation shown, the function performed by the symbol source 201 of FIG. 2 is effectively performed by the combination of the RF receiver 302 and the detector 401. The detector 401 converts demodulated signals received from the RF receiver 302 and produces raw symbols 406. As before, the delay line 402 produces delayed symbols 407 and a current symbol 409. Likewise, the comparator 403 asserts a signal 408 when the conditions described above are met, thereby causing the symbol corrector 404 to apply the predetermined function to the current symbol 409, resulting in a received symbol 405. It is anticipated that the processor-based implementation shown could alternatively be performed using discrete hardware elements.

Figure 4:
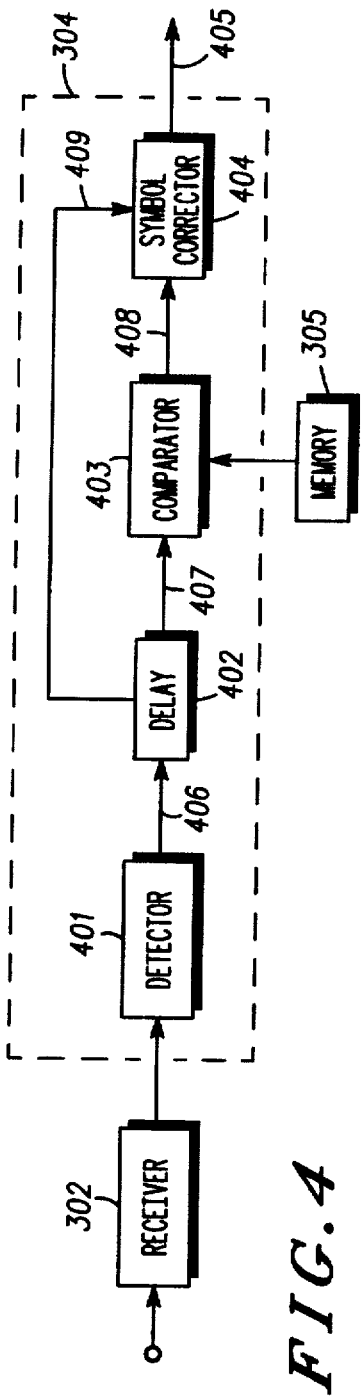
FIG. 4 is a block diagram illustrating how the apparatus for receiving symbols of FIG. 2 could be incorporated into the communication device of FIG. 3.
Figure 5:
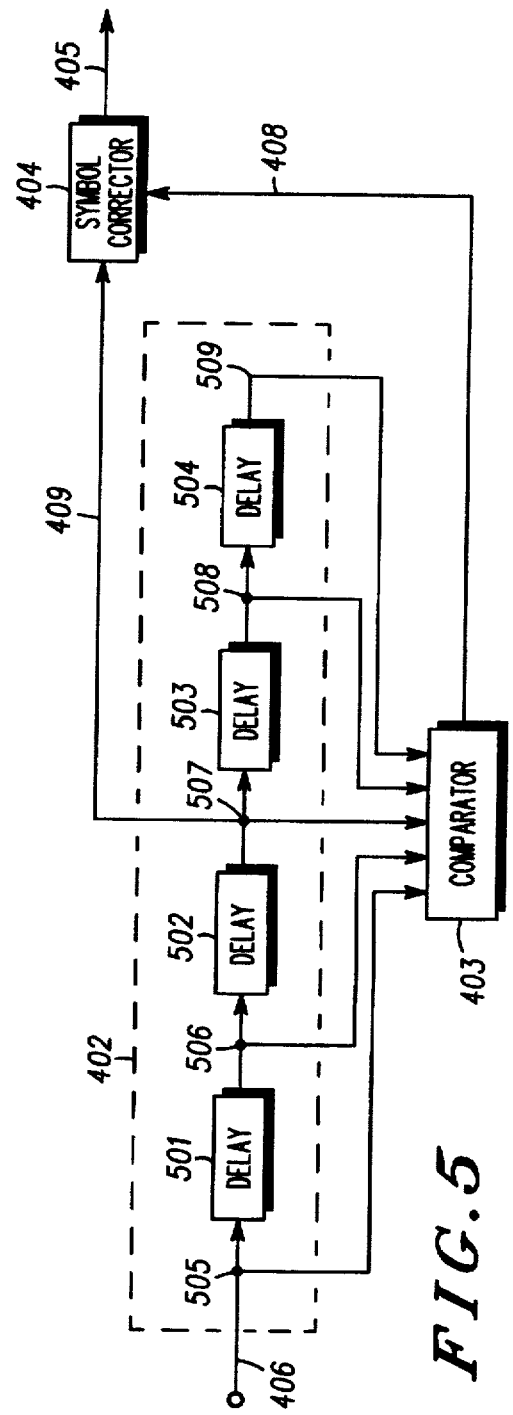
FIG. 5 is a block diagram further illustrating the apparatus for receiving symbols of FIG. 4.

FIG. 5 is a block diagram further illustrating the apparatus for receiving symbols of FIG. 4. The delay line 402 comprises delay elements 501–504 which produce delayed symbols 505–509. As shown, a middle delayed symbol 507 is used as the current symbol 409. However, it is understood that the current symbol does not in general have to be the middle delayed symbol 507, and could be any one of the delayed symbols 505–509. This could be necessary in communication devices which use a crystal filter having a non-symmetrical impulse response as an intermediate frequency (IF) filter.

With the implementation shown in FIG. 5, the delayed symbols 505–509 are compared by the comparator 403 with predetermined patterns like those shown in Table 1 when the current symbol 409 matches one of a set of predetermined values (e.g., the values shown in the middle column of Table 1). Alternatively, the comparator 403 can compare the sign of the middle symbol (current symbol) 507 with the signs of the previous symbol 508 and the subsequent symbol 506, asserting the signal 408 only when the signs are identical and the current symbol 409 matches one of a set of predetermined values. The latter method is advantageous in that it reduces the amount of delay necessary and simplifies the comparison procedure and yet recoups almost all of the sensitivity degradation that results from applying symbol correction unconditionally to a constant envelope signal.

Figure 6:
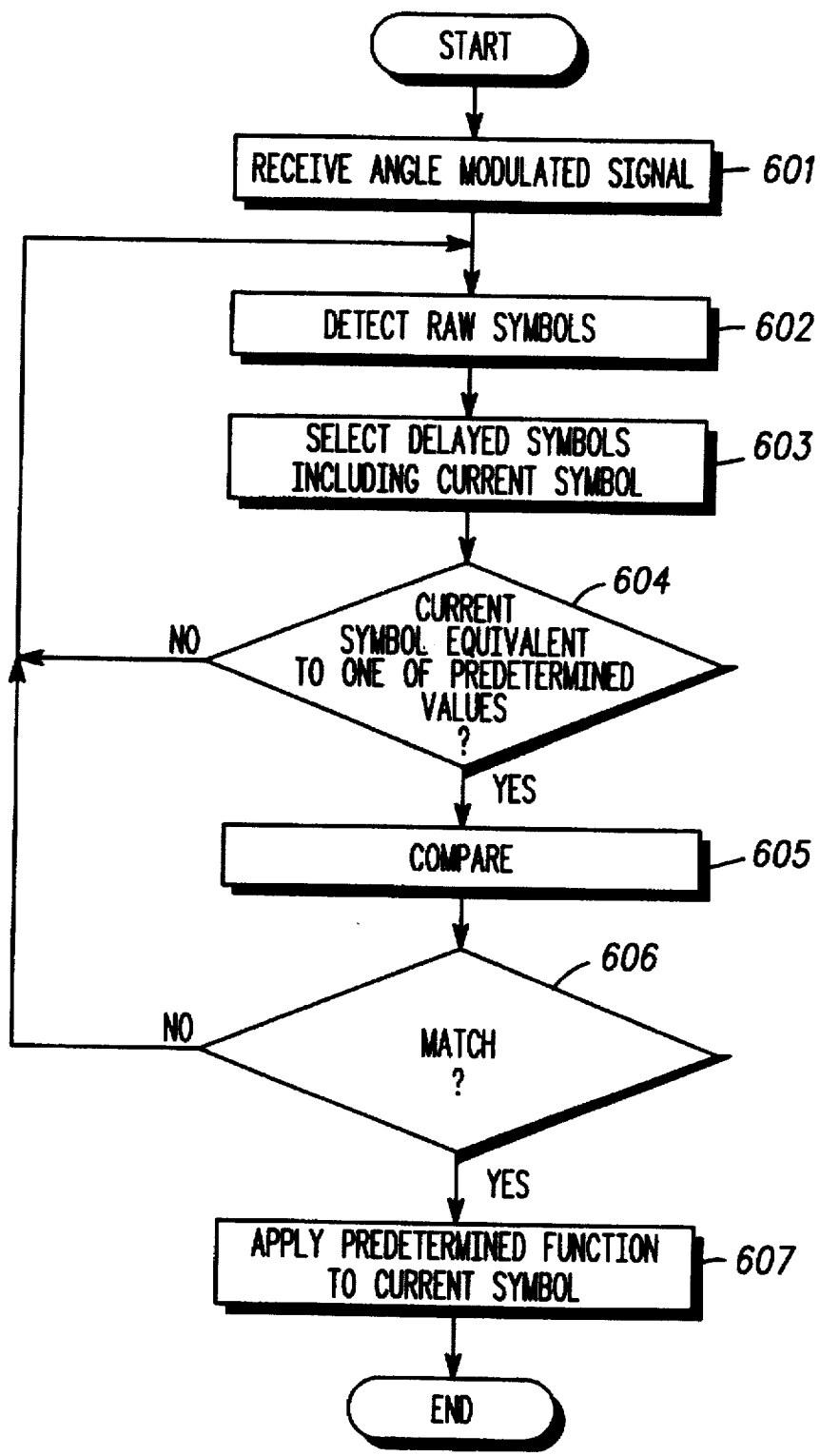
FIG. 6 is a flow chart of a method for determining received symbols.

FIG. 6 is a flow chart of a method for determining received symbols. The flow chart can be incorporated for use by a communication device, such as that shown in FIG. 3. At step 601, an angle modulated signal, such as a linear modulation CQPSK signal or a constant envelope modulation C4FM signal, is received. At step 602, raw symbols are determined, for example, by the detector 401. As the raw symbols are determined, delayed symbols, including a current symbol, are selected at step 603. If, at step 604, it is determined that the current symbol is not equivalent to one of a set of predetermined values (e.g., ±5 and ±7), then no further processing of the current symbol is performed, and the procedure continues at step 602.

If, at step 604, it is determined that the current symbol is equivalent to one of the set of predetermined values, a comparison is made at step 605. In a first embodiment, this comparison comprises comparing the delayed symbols selected at step 603 with at least one predetermined pattern. If, at step 606, a match between the delayed symbols and the at least one predetermined pattern is not made (i.e., a one-to-one correspondence), the procedure continues at step 602. In a second embodiment, the comparison of step 605 comprises comparing signs of the current symbol and a previous and subsequent symbol. If the signs do not match, the procedure again continues at step 602. However, in either the first or second embodiment, if a match is made at step 606, a predetermined function is applied to the current symbol to produce a received symbol at step 607.

With the present invention, a method and apparatus for receiving symbols in systems requiring both linear and constant envelope modulation is provided. This approach substantially eliminates performance degradation brought about by "long" phase transitions seen in linear modulation. Prior art solutions amount to little more than choosing between two individually unacceptable alternatives: either ignore the occurrence of such errant phase transitions to the detriment of linear performance or attempt to always correct them to the detriment of constant envelope performance. Through the detection of predetermined symbol patterns known to arise when an incorrect phase transition has occurred in linear modulation, a predetermined function can be applied to correct the incorrectly received symbols. Such an approach offers significant improvement to linear modulation performance while minimizing any negative effects on constant envelope modulation.

We claim:

1. An apparatus for receiving symbols comprising:
    a symbol source for providing a plurality of raw symbols;
    a delay line, operably coupled to the symbol source, for producing delayed symbols comprising a current symbol;
    a comparator, operably coupled to the delay line, for comparing the current symbol with a set of predetermined values and for comparing the delayed symbols with at least one predetermined pattern, wherein the comparator asserts a signal when the current symbol is equivalent to one of the set of predetermined values and the delayed symbols are equivalent to one of the at least one predetermined pattern; and
    a symbol corrector, operably coupled to the delay line and the comparator, for applying a predetermined function to the current symbol to produce a received symbol when the signal is received by the symbol corrector.

2. The apparatus of claim 1 further comprising a memory, operably coupled to the comparator, for storing the set of predetermined values and the at least one predetermined pattern.

3. The apparatus of claim 1, the symbol source further comprising a detector for detecting the plurality of raw symbols based on an angle modulated signal.

4. A wireless communication device comprising:
    a receiver for linear or constant envelope demodulation of an angle modulated signal:
    a detector, operably coupled to the receiver, for detecting a plurality of raw symbols based on the angle modulated signal;
    a delay line, operably coupled to the detector, for producing delayed symbols comprising a current symbol;
    a memory for storing a set of predetermined values and at least one predetermined pattern;
    a comparator, operably coupled to the delay line and the memory, for comparing the current symbol with the set of predetermined values and for comparing the delayed symbols with the at least one predetermined pattern, wherein the comparator asserts a signal when the current symbol is equivalent to one of the set of predetermined values and the delayed symbols are equivalent to one of the at least one predetermined pattern; and
    a symbol corrector, operably coupled to the delay line and the comparator, for applying a predetermined function to the current symbol to produce a received symbol when the signal is received by the symbol corrector.

5. The wireless communication device of claim 4, wherein the angle modulated signal comprises a CQPSK signal or a C4FM signal.

6. A wireless communication device comprising:
    a receiver for linear or constant envelope demodulation of an angle modulated signal:
    a detector, operably coupled to the receiver, for detecting a plurality of raw symbols based on the angle modulated signal;
    a delay line, operably coupled to the detector, for producing delayed symbols comprising a current symbol, a previous symbol, and a subsequent symbol, wherein the previous symbol is delayed more than the current symbol and the subsequent symbol is delayed less than the current symbol;
    a memory for storing a set of predetermined values;
    a comparator, operably coupled to the delay line and the memory, for comparing the current symbol with the set of predetermined values and for comparing a sign of the current symbol with signs of the previous symbol and the subsequent symbol, wherein the comparator asserts a signal when the current symbol is equivalent to one of the set of predetermined values and the sign of the current symbol matches the signs of the previous symbol and the subsequent symbol; and
    a symbol corrector, operably coupled to the delay line and the comparator, for applying a predetermined function to the current symbol to produce a received symbol when the signal is received by the symbol corrector.

7. The wireless communication device of claim 6, wherein the angle modulated signal comprises a CQPSK signal or a C4FM signal.

8. A method comprising steps of:
    detecting a plurality of raw symbols based on an angle modulated signal;
    selecting delayed symbols of the plurality of raw symbols, the delayed symbols comprising a current symbol;
    comparing the delayed symbols with at least one predetermined pattern when the current symbol is equivalent to one of a set of predetermined values; and
    applying a predetermined function to the current symbol to produce a received symbol when the delayed symbols match one of the at least one predetermined pattern.

9. The method of claim 8, further comprising the step of detecting the plurality of raw symbols, wherein the angle modulated signal comprises a CQPSK signal.

10. The method of claim 8, further comprising the step of comparing the delayed symbols with the at least one predetermined pattern when the current symbol matches one of the set of predetermined values, wherein the set of predetermined values comprises a first predetermined value corresponding to a $+5\pi/4$ phase shift in the angle modulated signal and a second predetermined value corresponding to a $-5\pi/4$ phase shift in the angle modulated signal.

11. The method of claim 10, the step of applying the predetermined function to the current symbol further comprising sub-steps of:
    mapping the current symbol to the received symbol when the current symbol is equivalent to the first predetermined value, wherein the received symbol corresponds to a $-3\pi/4$ phase shift; and
    mapping the current symbol to the received symbol when the current symbol is equivalent to the second predetermined value, wherein the received symbol corresponds to a $+3\pi/4$ phase shift.

12. A method comprising steps of:
    detecting a plurality of raw symbols based on an angle modulated signal;
    selecting delayed symbols of the plurality of raw symbols, the delayed symbols comprising a current symbol, a previous symbol, and a subsequent symbol, wherein the previous symbol is delayed more than the current symbol and the subsequent symbol is delayed less than the current symbol;

comparing a sign of the current symbol with signs of the previous symbol and the subsequent symbol when the current symbol is equivalent to one of a set of predetermined values; and applying a predetermined function to the current symbol to produce a received symbol when the sign of the current symbol matches the signs of the previous symbol and the subsequent symbol.

13. The method of claim 12, further comprising the step of detecting the plurality of raw symbols, wherein the angle modulated signal comprises a CQPSK signal.

14. The method of claim 12, further comprising the step of comparing the sign of the current symbol with the signs of the previous symbol and the subsequent symbol when the current symbol matches one of the set of predetermined values, wherein the set of predetermined values comprises a first predetermined value corresponding to a $+5\pi/4$ phase shift in the angle modulated signal and a second predetermined value corresponding to a $-5\pi/4$ phase shift in the angle modulated signal.

15. The method of claim 14, the step of applying the predetermined function to the current symbol further comprising sub-steps of:

mapping the current symbol to the received symbol when the current symbol is equivalent to the first predetermined value, wherein the received symbol corresponds to a $-3\pi/4$ phase shift; and mapping the current symbol to the received symbol when the current symbol is equivalent to the second predetermined value, wherein the received symbol corresponds to a $+3\pi/4$ phase shift.

16. In a wireless communication device that includes a receiver for linear or constant envelope demodulation of an angle modulated signal, a method for determining received symbols, the method comprising steps of:

receiving, by the receiver, a linear modulated signal as the angle modulated signal;

detecting, by a detector, a plurality of raw symbols based on the linear modulated signal;

selecting, by a delay line, delayed symbols of the plurality of raw symbols, the delayed symbols comprising a current symbol;

comparing, by a comparator, the delayed symbols with at least one predetermined pattern when the current symbol matches one of a set of predetermined values; and applying, by a symbol corrector, a predetermined function to the current symbol to produce a received symbol when the delayed symbols match one of the at least one predetermined pattern.

17. The method of claim 16, further comprising the step of receiving the linear phase modulated signal, wherein the linear modulated signal comprises a CQPSK signal.

18. The method of claim 17, further comprising the step of comparing the delayed symbols with the at least one predetermined pattern when the current symbol matches one of the set of predetermined values, wherein the set of predetermined values comprises a first predetermined value corresponding to a $+5\pi/4$ phase shift in the linear modulated signal and a second predetermined value corresponding to a $-5\pi/4$ phase shift in the linear modulated signal.

19. The method of claim 18, the step of applying the predetermined function to the current symbol further comprising sub-steps of:

mapping the current symbol to the received symbol when the current symbol is equivalent to the first predetermined value, wherein the received symbol corresponds to a $-3\pi/4$ phase shift; and mapping the current symbol to the received symbol when the current symbol is equivalent to the second predetermined value, wherein the received symbol corresponds to a $+3\pi/4$ phase shift.

\* \* \* \* \*